UNITED STATES PATENT OFFICE.

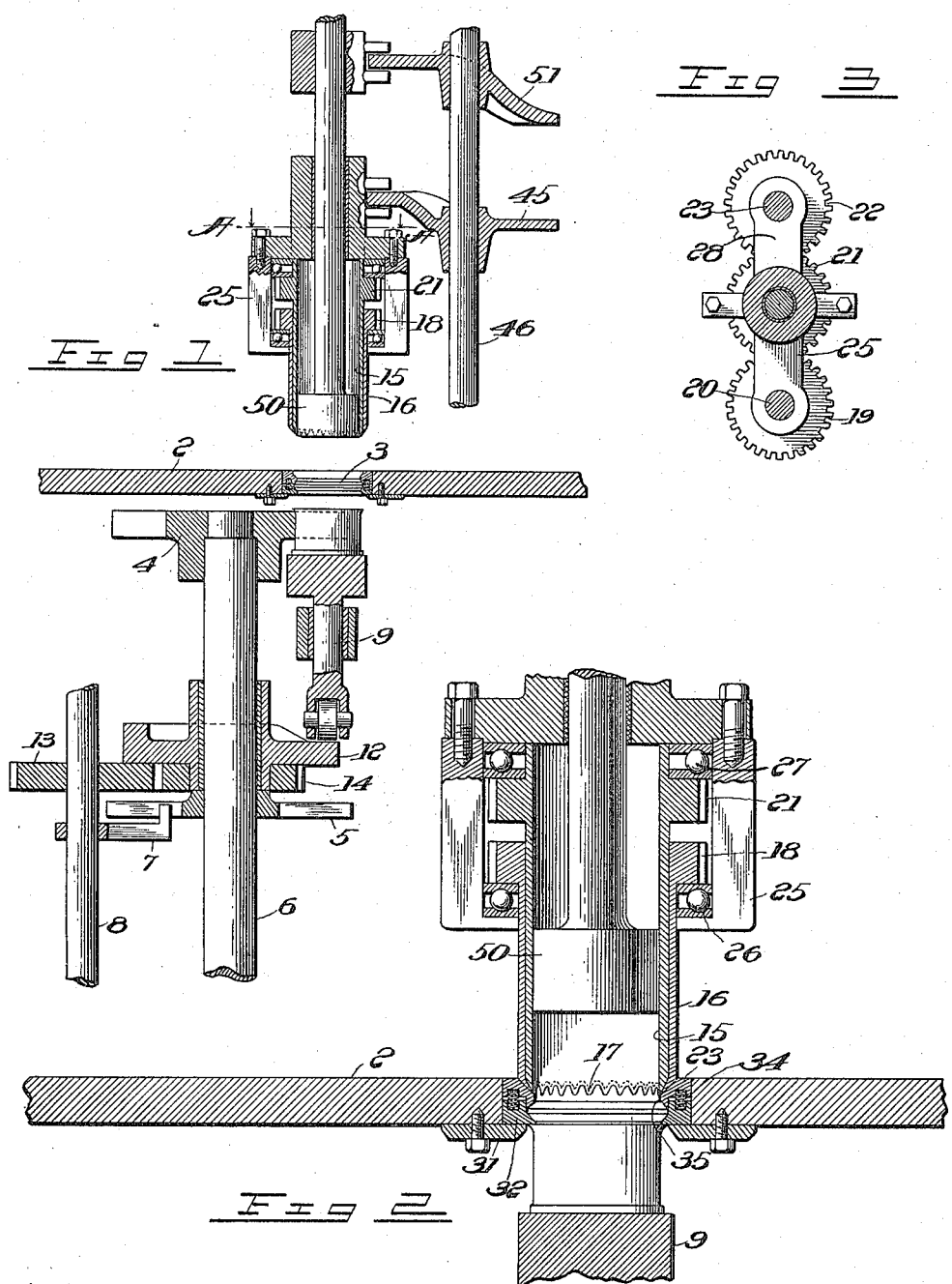

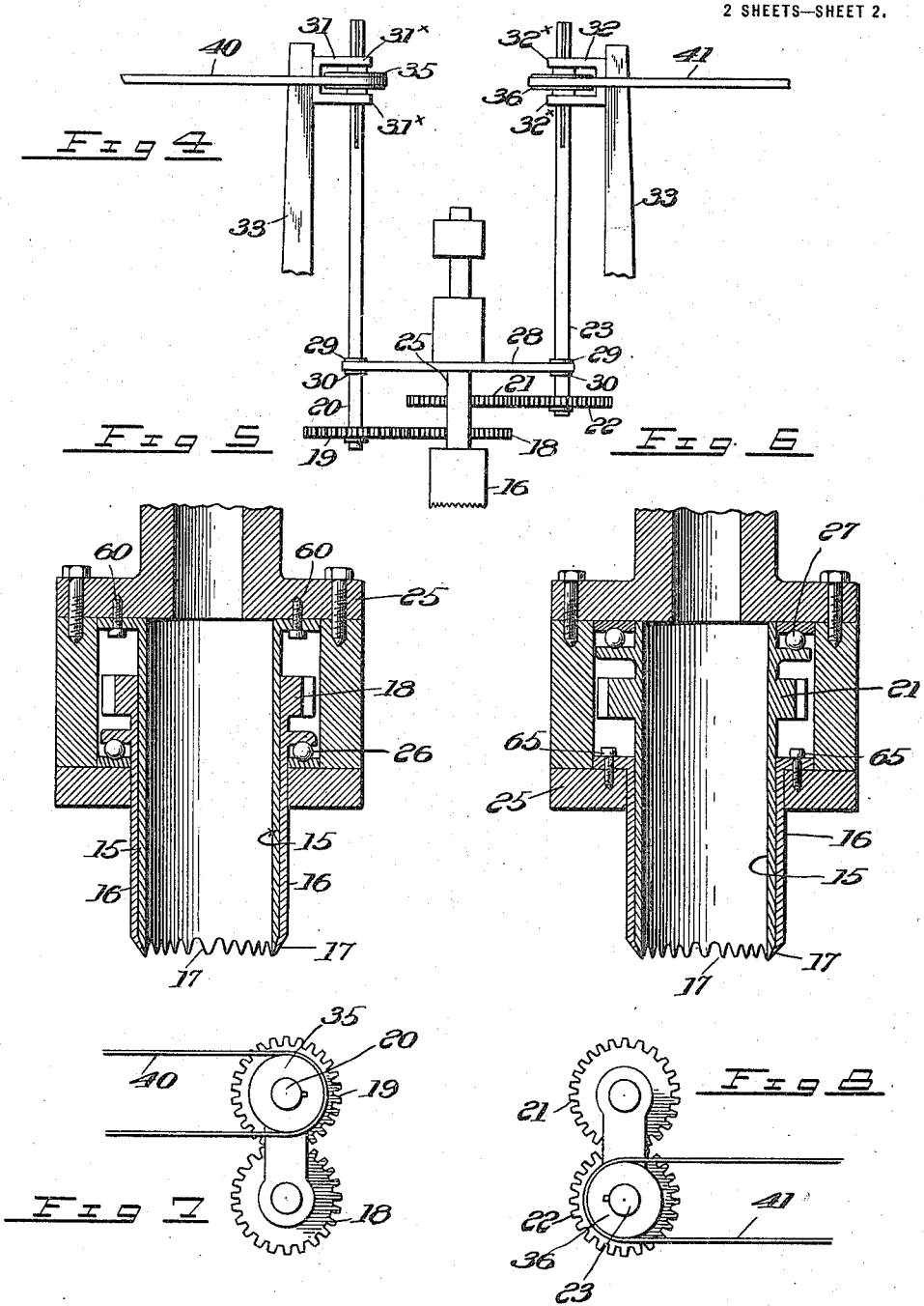

JAMES SCHLOTHAN, OF SAN FRANCISCO, CALIFORNIA, AND WILLIAM F. SCHLOTHAN, OF KETCHIKAN, TERRITORY OF ALASKA.

CUTTING MEANS FOR CANNING APPARATUS.

1,152,441.  Specification of Letters Patent.  Patented Sept. 7, 1915.

Application filed February 17, 1915. Serial No. 8,791.

*To all whom it may concern:*

Be it known that we, the undersigned, JAMES SCHLOTHAN and WILLIAM F. SCHLOTHAN, residents, respectively, of the city and county of San Francisco, State of California, and the city of Ketchikan, Territory of Alaska, have made a new and useful invention—to wit, Cutting Means for Canning Apparatus; and we do hereby declare the following to be a full, clear, and concise and exact description of the same.

This invention relates to cutting means for canning apparatus and is an improvement on our Patent No. 1,125,737, dated January 19, 1915.

In this specification and the annexed drawings, we disclose the invention in the form which we consider the best, but it is to be understood that we do not limit ourselves to such form because the invention may be embodied in other forms, and it is also to be understood that in and by the claims following the description herein we intend to cover the invention in whatever form it may be embodied.

Referring to the drawings: Figure 1 is a sectional elevation of a portion of a canning machine including the device of our invention. Fig. 2 is a vertical section of a fragment of the machine on a larger scale. Fig. 3 is a section taken on the line A—A Fig. 1. Fig. 4 is an elevation of the knife alining and driving means. Figs. 5 and 6 are vertical sectional views of modified forms of the cutter. Fig. 7 is a plan view of the modified form of our invention embodied in Fig. 5. Fig. 8 is a plan view of the modified form of our invention embodied in Fig. 6.

The general construction of the machine, such as the frame and driving means are well known to persons familiar with the art and will not be described or illustrated herein. The function of the machine is to cut the food product into the desired shape and insert it into the can, and machines of this general character are employed in the salmon canning industry for cutting the fish meat into cylindrical shapes, corresponding in size to the size of the can. The fish are cleaned and boned and formed into a cake, either cooked or raw, and the portions to be inserted into the separate cans are cut from the cake.

The cake is fed along a table 2 above which is arranged the cutting apparatus and below which are arranged the cans and the can feeding apparatus. The table is provided with an aperture 3 alined with the cutter and the can, through which the cut portion of fish meat passes into the can. Arranged below the table 2 is a turret 4 which is given a step by step movement by any suitable means, such as the spider 5 secured to the turret shaft 6 and the revolving arm 7, fixed to the shaft 8, which is rotated at the proper speed by any suitable mechanism.

The turret 4 conveys the empty cans into alinement with the aperture 3 and they are then moved into contact with the lower surface of the table 2 by the plunger 9, which is vertically reciprocated by some suitable means, such as the cam 12, loosely mounted on the shaft 6. The cam is rotated by shaft 8 through the gears 13 and 14, the gear 14 being attached to the cam. After the can has been filled, the plunger 9 moves downwardly, the can is again seated in the turret, which revolves and removes the filled can and places another empty one in position.

Arranged above and alined with the aperture 3 is the cutter. The cutter consists of two cylindrical knives 15 and 16 arranged concentrically and contiguous. The lower or cutting edges of the knives lie in the same plane and are provided with sharpened teeth 17. The lower edge of the inner knife 15 is beveled or chamfered on its outer surface and the lower edge of the outer knife 16 is beveled or inclined, so that the inner surface thereof contacts with the bevel on the outer surface of the inner knife. The outer surface of the inclined portion of the outer knife is beveled at a greater angle than the inner surface in order to produce a sharp cutting edge. By this arrangement the outer knife 16 cannot move vertically upward with respect to the inner knife and the inner knife cannot move vertically downward with respect to the outer knife. The movement in the opposite vertical direction of the knives is prevented by their mounting, thereby causing the ends to be always in contact.

Means are provided for rotating the knives in opposite directions or in the same direction at the same rate or at different rates of speed, or for rotating one knife only in either direction while the other knife is at rest. Said means may comprise the following structure: Secured to or formed integral with the knife 16 is a gear 18 which is engaged by gear 19 mounted on shaft 20, and secured to or formed integral with knife 15 is a gear 21 which is engaged by gear 22 mounted on shaft 23. The knives 15 and 16 are mounted in a suitable frame 25 upon anti-friction bearings 26 and 27. The frame 25 has a cross arm 28 in which one end of the shafts 20 and 23 are journaled. Collars 29 and 30 are secured on the shafts 20 and 23 which engage the upper and lower sides of the arm 28 and cause the shafts to move up and down with the frame 25 so as to maintain the gears 19 and 22 in alinement with the gears 18 and 21 respectively. The shafts 20 and 23 are respectively slidably journaled in bearings 31 and 32 which bearings are secured to fixed supports 33. Pulleys 35 and 36 respectively are slidably mounted on the shafts 20 and 23 and rest between the end members 31$^x$ and 32$^x$ of the bearings 31 and 32 respectively so that the pulleys do not move longitudinally with the shafts. The pulleys are feathered to the shafts so that when rotated they cause the shafts to rotate. Power is applied to pulley 35 by belt 40 to drive the shaft 20. Power is applied to pulley 36 by belt 41 to drive the shaft 23. The shafts may be driven in either direction together at the same rate or at different rates of speed or they may be driven in different directions with relation to each other at the same rate or at different rates of speed by any suitable power (not shown) through the medium of said belts 40 and 41 and pulleys 35 and 36, whereby the knives 15 and 16 may be accordingly driven through the medium of the gears 19 and 18 and the gears 22 and 21 respectively. The shafts 20 and 23 and the bearings 31 and 32 maintain the frame 25 in its proper position so that the knives 15 and 16 aline with the aperture 3.

The frame 25 in which the knives are mounted is movable vertically by any suitable mechanism such as the cam 45 secured to the shaft 46. Arranged within the knives is a plunger 50 which is depressed after the cutting operation is completed forcing the fish meat from the cutter into the can. The plunger is reciprocated at proper times by any suitable mechanism, such as the cam 51 on shaft 46.

Arranged in the aperture 3 in the table 2 are means for removing from the knives any scraps of fish meat which may adhere to the cutting edges thereof. Secured to the under side of the table 2 is an annular ring 31 which partly underlies the aperture 3. Arranged in the aperture and resting on the ring 31 is an annular ring 32 having its inner surface sloping inwardly toward the bottom. Arranged in the aperture above the ring 32 is an annular ring 33 having a depending portion 35 engaging the upper portion of the inner surface of the ring 32. The upper portion of the ring 33 is beveled on the same angle as the outer surface of the cutting end of the outer knife 16 and the diameters of the two beveled surfaces are equal, so that when the cutter is depressed, the outer surface thereof contacts with the beveled portion of ring 33, thereby cleaning the knives. Arranged between the rings 32 and 33 are a plurality of springs 34, so that the ring 33 is yieldingly mounted and is capable of a limited vertical movement under pressure, whereby contact between the knives and the ring 33 is assured without necessitating too close an adjustment.

In the operation the fish meat is fed over the table 2 and across the aperture 3, the can is raised to position below the aperture and the cutter descends, shearing a cylinder of fish meat from the mass, the plunger then descends and forces the cylindrical portion into the can. The can then descends and is removed, and the cutter and plunger are raised to allow the fish meat on the table to be moved to present another portion over the aperture, when the operation is repeated.

In the modification shown in Figs. 5 and 7, the inner knife 15 is secured to the frame 25 by bolts 60 and held against rotation. In this form of cutter the gears 21 and 22 shaft 23, pulley 36 and belt 41 are eliminated. The knife 16 and driving means are the same as in the preferred form of the cutter above described, said knife being rotated by power through the medium of belt 40, pulley 35, shaft 20, and gears 19 and 18.

In the modification shown in Figs. 6 and 8, the outer knife 16 is secured to the frame 25 by bolts 65 and held against rotation. In this form of cutter the gears 18 and 19, shaft 20, pulley 35 and belt 40 are eliminated. The inner knife 15 and driving mechanism are the same as in the preferred form of cutter, said knife being rotated by power through the medium of belt 41, pulley 36, shaft 23 and gears 22 and 21.

We claim:

1. In an apparatus of the character disclosed, a cutter comprising a pair of contiguous co-acting knives for cutting a cylindrical body of material, and independently driven means for rotating said knives with relation to each other in opposite directions or in the same direction.

2. In an apparatus of the character disclosed, a cutter comprising a pair of contiguous co-acting knives for cutting a cylindrical body of material and means for rotating only one of said knives at a time.

3. In an apparatus of the character disclosed, a cutter comprising a pair of contiguous co-acting knives for cutting a cylindrical body of material and means for rotating only one of said knives at a time, and means for reciprocating said cutter.

4. In an apparatus of the character disclosed, a cutter comprising a pair of concentric co-acting knives, the outer surface of the cutting edge of the inner knife being beveled and the inner surface of the cutting edge of the outer knife being inclined inwardly so as to contact with the beveled surface of the inner knife and means for rotating only one of said knives at a time.

5. In an apparatus of the character disclosed, a cutter comprising a pair of concentric co-acting knives, the outer surface of the cutting edge of the inner knife being beveled and the inner surface of the cutting edge of the outer knife being inclined inwardly so as to contact with the beveled surface of the inner knife and means for rotating only one of said knives at a time, and means for rotating said knives with relation to each other in opposite directions or in the same direction.

6. In an apparatus of the character disclosed, a cutter comprising a pair of contiguous co-acting knives for cutting a cylindrical body of material, means for rotating only one of said knives at a time and means for ejecting the body of material out of the forward end of said cutter.

In testimony whereof, we have hereunto set our hands at the city and county of San Francisco, this sixth day of February, 1915.

JAMES SCHLOTHAN.
WILLIAM F. SCHLOTHAN.

In presence of—
ALAN FRANKLIN,
P. S. PIDWELL.

Copies of this patent may be obtained for five cents each, by addressing the "Commissioner of Patents, Washington, D. C."